United States Patent [19]
Korth

[11] Patent Number: 4,794,586
[45] Date of Patent: Dec. 27, 1988

[54] ROTARY ACCESS ARM FOR OPTICAL DISKS

[75] Inventor: Hans-Erdmann Korth, Stuttgart, Fed. Rep. of Germany

[73] Assignee: International Business Machines Corporation, Armonk, N.Y.

[21] Appl. No.: 139,344

[22] Filed: Dec. 29, 1987

[30] Foreign Application Priority Data

Dec. 30, 1986 [EP] European Pat. Off. ........... 86118169

[51] Int. Cl.$^4$ ............................ G11B 3/08; G11B 7/00; G11B 21/10
[52] U.S. Cl. .................................... 369/215; 369/222; 369/244
[58] Field of Search .................... 369/215, 222, 244

[56] References Cited

U.S. PATENT DOCUMENTS 4,310,918  1/1982  Hirata .................................. 369/215
4,408,311 10/1983  Suzuki et al. ...................... 369/222

*Primary Examiner*—Steven L. Stephan
*Attorney, Agent, or Firm*—James M. Thomson

[57] ABSTRACT

A rotary access arm, e.g. for an optical disk has crossed voice coil actuators (6a,b) for in-plane and vertical movements, e.g. track and focus control; the actuators are secured to its distal end in close proximity to the focussing optical system (5a,b). The heavy elements like laser light source (8) and beam analyzer (11) are arranged near the rotational axis (10) of the arm (or are completely separated therefrom) allowing a very lightweight construction. In an optical storage system using stacked disks coaxial access arms with individual position control are provided. For increased reliability of operation each access arm has two focussing optical systems at its distal end, viewing in opposite directions, and a bistable optical switch (12) to selectively focus the laser beam on one of the two adjacent optical disks. The focussing optical system can be realized with individual lenses or with two conjugate plano-aspheric lenses bonded to a 90° reflection prism.

11 Claims, 3 Drawing Sheets

ROTARY ACCESS ARM FOR OPTICAL DISKS

DESCRIPTION

The invention relates to a rotary access arm in accordance with the preamble of claim 1.

Optical disk devices store information which is recorded on the surface of the rotating disk as optical discontinuities along circular or spiral tracks. These optical discontinuities may have the form of small indentations in the surface of the disk which give rise to intensity variations in the reflected light of a focussed laser beam guided along the track to read out the information; the discontinuities may be written by another (more powerful) laser beam into a photosensitive coating on the surface or may be stamped into the surface by a suitable device. Another method of storing information on optical disks uses so-called thermomagnetic layers whose vertical magnetic orientation can be changed in an external field when a focussed laser heats a spot on the surface over the Curie point; readout is effected by the Faraday or Kerr effects.

The inherent high information storage density achievable with optical disks makes these an attractive storage medium for information, e.g. for audio and video signals or for digital data; on the other hand this high storage intensity puts severe requirements on the devices to record and to retrieve the information. In particular for digital storage disks with track widths and track-to-track separations in the order of micrometers the access arm of the optical disk must be positioned with extreme precision and yet with high speed to supply the recorded data to a computer. The focussed laser beam that is used to retrieve the information from the disk (or to write the information onto the disk) is therefore controlled in a servo loop with respect to track following and maintaining its focus on the information recording surface. In addition, appropriate controls have to be provided to seek a new track if the disk is operated as a direct access device (which is a main advantage of disk-like storage systems).

A further important objective of digital storage systems is a high overall storage capacity which, in spite of the high storage density of a single optical disk, will normally require several disks to be arranged in a stack.

DISCUSSION OF THE PRIOR ART

From these requirements, the art has recognized the need for small, lightweight access arms with low inertia that can be positioned rapidly and with small setting times to a desired track. In European patent application 156 460, a rotary pick-up arm with low inertia is proposed for an optical disk player. In this design the heavy optical elements like the laser and the analyzer for the light reflected at the optical disk surface are held stationary and coupled to the arm through a deviation prism in the rotation axis of the arm. For focus control, the distal end of the arm carries a coil in a gap of a permanent magnet which is arranged along the curved path of the arm. Radial positioning of the arm is effected through its drive axis and thus still requires a rather solid arm construction to suppress vibrations. In addition, the mounting assembly for the lens and the focus control coil are rather voluminous and do not allow for very close packing of disks in a disk stack.

European patent specification No. 74131 describes another principle for rotational movement of a swinging arm device scanning an audio optical disk. The driving mechanism consists of two coils that are arranged symmetrically with respect to the arm, each of the freely moving coils enclosing a permanent stator magnet. These coils thus only provide for the torque necessary to rotate the arm but cannot be used for focus control. The optical system itself is conventional and does not allow close stacking of disks.

A small and lightweight access arm for optical disks has also been proposed in European patent application No. 85116116.6 where a transparent beam-like slab is used as an optical wave guide and carries at its surface the optical elements for beam generation, beam forming and optical evaluation. Radial positioning of this arm and focus control has been done, however, in conventional ways.

SUMMARY OF THE INVENTION

It is, therefore, the object of the present invention to provide an access arm of the aforementioned kind, in particular for optical disks, which can be positioned with high speed and small forces, which allows for easy and fast controlled movements in lateral and vertical directions, e.g. for track and focus control, and which is flat, e.g. allowing enough for close stacking of optical disks.

This object is achieved by the invention as claimed; embodiments of the invention are described in the dependent claims.

The access arm according to the invention is of the rotary type where a beam-like lever is rotated about a fixed axis to scan the rotating optical disk along a segment of a circle. The radial displacement of the arm for track selection and the vertical displacement for focus control are both achieved by two cross-wound voice coils secured to the distal end of the access arm. Either direction of movement is selected by supplying parallel or antiparallel currents to the voice coils. Applying the forces to the arm at its distal end relieves the axis from loads and allows, together with the arrangement of the heavy optical elements near the axis or even separated from the arm itself, to build the arm from appropriately folded thin metal sheet and yet to maintain the required rigidity. To further decrease the accelerated mass, an optical component can be used that integrates a deflection prism with aspheric focussing surfaces. If used in a stack of optical disks, two optical systems can be mounted on the arm together with a bistable optical switch to access either of the optical disk surfaces adjacent to the arm. Such arms may be used as a fail-safe design to maintain accessibility of data in optical disks, even if the laser of a particular access arm burns out.

The proposed access arm can be used with all types of optical disks (read only, read once, read/write) and all types of optical recording materials (burned in, stamped, thermomagnetic films, amorphous films, etc.).

Embodiments of the invention will now be described with reference to the drawings in which:

The foregoing and other objects, features and advantages of the invention will be apparent from the following more particular description of preferred embodiments of the invention, as illustrated in the accompanying drawings.

BRIEF DESCRIPTION OF THE DRAWINGS

In the drawings, like reference numerals are used to designate like components.

DESCRIPTION OF THE PREFERRED EMBODIMENTS

Figure 1A:
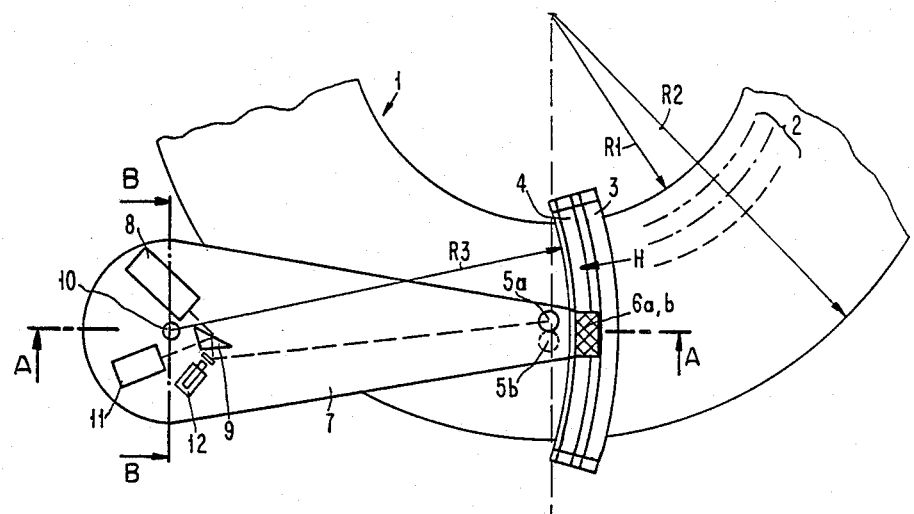
FIG. 1A shows a top view of a stack of optical disks with rotary access arms according to the invention.
Figure 1B:
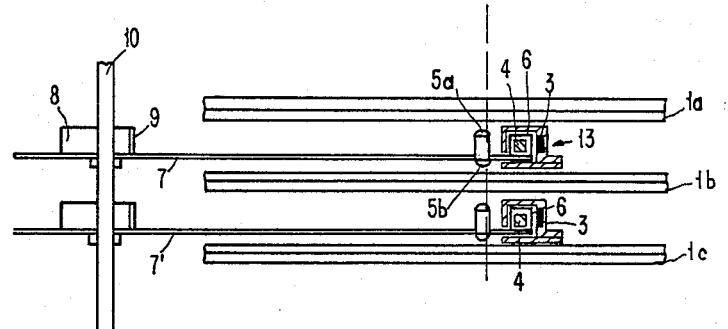
FIG. 1B shows a cross section of FIG. 1A along the line A—A.

Referring now to FIGS. 1A, 1B a stack of optical disks 1a, 1b, 1c is viewed from above, each disk carrying information recording tracks 2 with optical discontinuities in a ring-shaped area extending between two radii R1 and R2. (A typical width R2-R1 is in the order of 20 mm.) A typical width of a track is in the order of 1 micrometer and the track-to-track separation is typically 1.6 micrometers. To access the information tracks 2, the beam of a laser 8 is deflected by a mirror or a prism 9 to be focussed by a high magnification lens 5a or 5b onto the information-bearing surface of disk 1. For readout in the reflective mode operation (in contrast to transmissive readout) the light reflected at information tracks 2 returns along the optical path of the incident laser beam and is deflected to an analyzing unit 11 which senses the change in an appropriate optical property of the reflected beam, e.g. its intensity, its state of polarization, etc. to retrieve the information stored in track 2. Commercially available mini lenses may be used for focussing that have a height of some 8 mm and a mass of some 0.6 g.

The focussing lens 5 (or the two symmetrical lenses 5a, 5b in a preferred embodiment of the invention) are mounted at the distal end of an access arm 7, which is rotated about an axis 10 arranged parallel to the axis of rotation of disk 1 and common to all arms 7. One access arm is provided for each information-bearing surface in the stack; each arm is pivotally supported in a precision bearing for independent movement. (Fixed mounting of the arms on rotatable axis 10 is also possible.) Rotating an arm 6 about axis 10 allows to select one of the information tracks 2 of the corresponding disk 1. The other optical elements in the light path to access information tracks 2, such as laser 8, deflection prism 9, analyzing unit 11 and optical bistable switch 12 can also be mounted on arm 7, preferably in the vicinity of axis 10 to reduce the moment of inertia with respect to this axis. In another embodiment these optical elements can be mounted stationary outside the arm and coupled to the lenses 5 on arm 7 by a suitable optical deflection arrangement, e.g. a prism arranged in the rotational axis 10 of arm 7.

Actuation of an arm 7 around axis 10 to select an information track 2 and in vertical direction to control the focus of lens 5 on the surface of disk 1 is achieved by suitably exciting two voice coils 6a, 6b, whose windings are crossed in a way to be described later in more detail.

Voice coils 6 intersect a magnetic field H, which is generated in the plane of the drawing, e.g. by a permanent magnetic stator yoke 3 mounted stationary with respect to optical disk 1 and fixed with respect to its chassis. The stator yoke has the shape of a section of an arc and is arranged opposite to a conformally bent arc of soft magnetic material 4 around which the coils 6 are wound for free movement. To avoid stray fields that might disturb magnetooptical recording materials on the information-bearing surface a magnetic shielding 13 may be provided around the stator and the yokes.

Other configurations of magnetic and nonmagnetic materials are also usable as long as the magnetic field 4 is generated to intersect the voice coils 6. A resilient fixture of the magnetic arrangement can also be used.

Figure 1C:
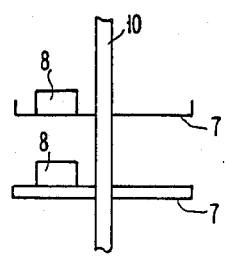
FIG. 1C shows a cross section of FIG. 1A along the line B—B.

The substantially flat arm 7 may consist of a metallic thin sheet that is suitably folded to provide the necessary rigidity; two possible cross sections of the folded sheet are shown in FIG. 1C, the bottom example representing a closed, box-like structure. Rigidizers, such as bent sheets, may also be distributed along the surface of arm 7 Metallic foils have the further advantage of providing efficient dissipation of the heat generated in the voice coils if high acceleration values with the accompanying high control currents are desired. An example of suitable materials for arms 7 are copper-beryllium or titanium foils. To avoid arm twist, the voice coils should be mounted such that the magnetic force attacks in the plane of the arms 7.

Other materials are also suitable for arm 7, including transparent elastic slabs, like in EP No. 85116116.6, that might be used as lightwave guides to avoid schlieren effects in the turbulent air between the optical disks in a stack.

As there are no loading forces between the access arm 7 and the information-bearing surface (contrary to magnetic disks) arm 7 must only provide the necessary rigidity to withstand the acceleration forces that occur during track seek and focus control. The proposed mounting of the actuating voice coils near the focussing lens suppresses vibrations of the lens and guarantees an efficient control of the lens even if arm 7 is not perfectly rigid (and might slightly bend or vibrate) as long as the entry and exit beams are still collected by the lens 5 and the optical evaluation devices 11. The required electrical drive power is also very low (in the order of 1W).

The absence of lens vibrations during a track-seek operation allows to position the arm directly over a selected track so that no two-step control process is required as in the state of the art, where a coarse control is to be followed by fine-track control.

The speed requirements for focus control are also easily satisfied, as the high surface quality of available optical disks does not necessitate very rapid lens movements (in contrast to high-speed track control).

Figure 2:
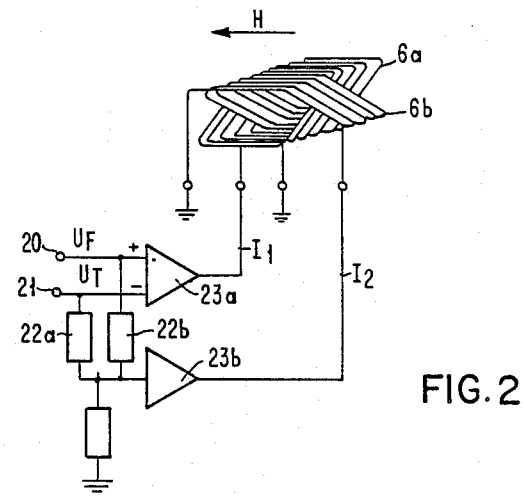
FIG. 2 shows an isometric view of the crossed voice coils used in the access arm of FIG. 1, together with a part of its electronic control circuits.

Referring now to FIG. 2, there is shown the arrangement of the crossed voice coils 6a, 6b whose windings are inclined to opposite sides under, e.g. 45°, with respect to the vertical. Also shown in FIG. 2 is the direction of the magnetic field H which is parallel to the windings on top and at the bottom of the coils. Each winding has one terminal connected to ground and the other to the outputs of an operational amplifier 23a, 23b, the first of which receives a servo signal U at its terminal 20 for focus control and $U_T$ at its terminal 21 for track control. The output of ampiifier 23a is, therefore, proportional to $U_F-U_T$. The second operational amplifier (23b) receives $U_F$ and $U_T$ via resistors 2 (22a, 22b) at its single output, thus generating an output signal that is proportional to the sum $U_F+U_T$. The operational amplifiers thus generate currents $I_1$, $I_2$ flowing in the same sense (e.g. both upwards or both downwards) if a lateral displacement of the access arm is desired for track seek or, alternatively, currents in opposite direction if up and down movements of the arm are required for focus control.

In a particular embodiment a crossed coil with a resistance of 2.5 ohms was used and subjected to a current of 1 ampere. The magnetic field in the air gap of the yoke (consisting of a permanent cobalt/samarium magnet) was about 5.000 gauss, resulting in an accelerating force of some 30g. If operated with a (low experimental) frequency of 50 Hz, the peak acceleration of the arm was 15 g per amp. For a current of 8 amp., an acceleration value of 100 g was obtained. Acceleration values in this order allow to position an access arm within an annular area of some 20 mm in times of some ms.

The optical components and electrical circuits required to close loop control with respect to track following and focus are known in the art and need not be described here in detail.

Figure 3:
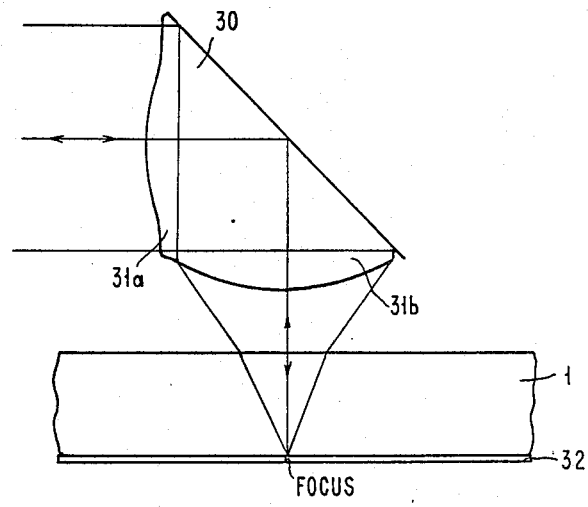
FIG. 3 shows an integrated optical component to be used with the access arm of FIG. 1 to focus the laser beam on the optical disk.

FIG. 3 shows an alternative to conventional lenses or lens systems 5a, 5b for the access arm. This optical component combines a deflection prism 30 with two conjugate planoaspheric lenses 31a, 31b which are glued to the kathedes of the prism. The laser beam incident from the left is thus deflected and focussed on the information-bearing surface 32, which is located under the transparent substrate of optical disk 1. The aspheric surfaces of lenses 31a, 31b are shown exaggerated for purpose of clarity. For an aperture of some 3 mm, the mass of this optical component will be about 50 milligrams only.

In the preferred embodiment of FIG. 1, the access arm carries two focussing lenses 5a, 5b viewing in opposite directions for selectable access to one of the two adjacent optical disks, each disk having a single information-bearing surface on a transparent substrate, and is preferably covered by a transparent protective coating. In a stack of disks, each information-bearing surface is thus accessible by two arms in the arrangement of access arms. The operational reliability of the optical disk system is, therefore, increased as well as its operating flexibility.

As an example, data can be written into an optical disk surface by one access arm and verified by the other or one access arm can erase the data for subsequent writing of new data by another arm. As the intermediate access arms in a stack are controlled independently from each other by their own voice coils, both arms can operate on different tracks in different optical disks to allow "smart housekeeping," e.g. erasing of abandoned files, relocation of files, etc. This opens the possibility to operate the optical disk stack with regard to minimal track seek movements to further improve its access seek times.

Figure 4:
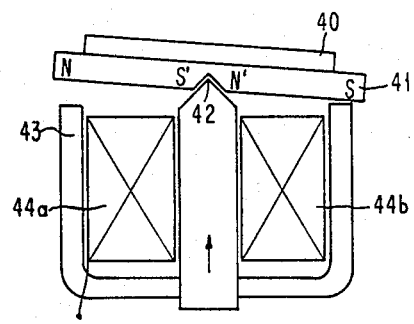
FIG. 4 shows a simple bistable optical switch in cross section.

Switching the optical path from one focussing lens system to the other requires a bistable optical switch, preferably of simple design, small weight, and without requiring power to maintain any of its stable positions. FIG. 4 shows a schematic cross section of a bistable switch which meets these requirements. It uses a mirror 40 (circular or elliptical as desired by the optical system in which it is used) that is bonded to a permanently magnetized ferromagnetic bar or lever 41, centrally supported by edge 42 over a yoke 43 of magnetic material. The magnetic lever 41 thus formed assumes one of two stable positions in which one of its magnetic pole contacts on side of yoke 43 to close the magnetic circuit (e.g. from pole S through the yoke and the ferromagnetic support with edge 42 back to the lever at pole N'). Coils 44a, 44b are provided for flipping the lever to the other stable position. The tilt lever or the yoke may be provided with a cover layer to prevent sticking in the stable positions.

This bistable light deflection unit guarantees reproducible optical deflection angles in both positions, has a low power consumption and is reliable in its operation. It can be designed with small dimensions and a very low mass so that it is fit for being mounted directly on the access arm 7.

The tilt angle can easily be adjusted by changing the position of edge 42 which is slidably received in yoke 43.

Figure 5A:
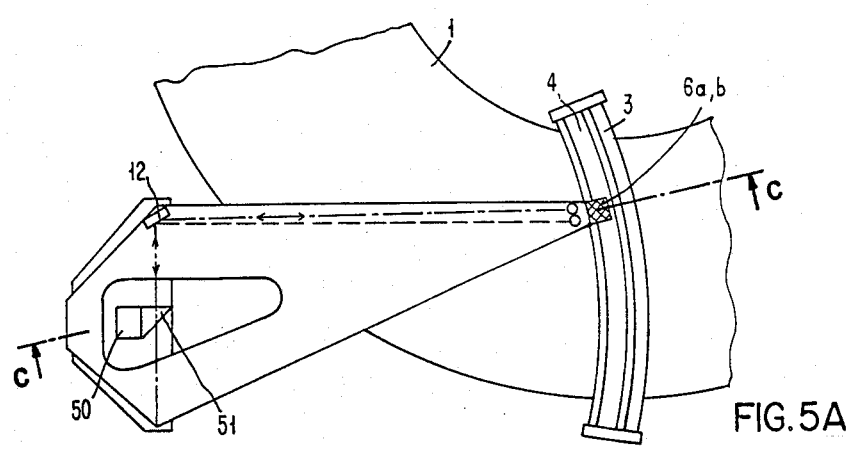
FIG. 5A shows a top view of another embodiment of the rotary optical arm according to the invention.
Figure 5B:
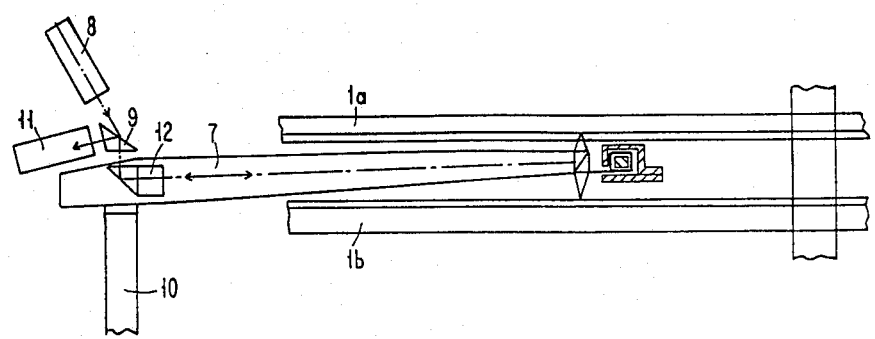
FIG. 5B shows a cross section of the optical arm in FIG. 5A along the line C—C.

Referring now to FIG. 5A, 5B there is shown another embodiment of a rotary access arm for optical disks in accordance with the present invention. It is distinguished from the embodiment of FIG. 1A, 1B by the triangular rig used for the arm and the stationary arrangement of the heavy optical elements separated from the arm structure itself. The actuator arrangement with magnetic stator and crossed voice coils is the same. The optical beam paths of the stationary optical elements and on the arm rig itself (the bistable deflector 12 and the focussing lenses 6a, 6b) are linked by two crossed deflection primms 50, 51, one of which is arranged to deflect the entry and the exit beam along the rotational axis of arm 7.

The embodiment of FIGS. 5A, 5B has less inertia than the embodiments of FIGS. 1, but is not equally well suited for closely stacked actuator arms.

The above-detailed description of the proposed optical rotary arm provides a compact, fast and simple mechanism consistent with optical storage devices for direct or random access. The flat design of the arm allows close stacking of several optical disks and its small mass a high frequency response of the servo system controlling track following and focus. The relatively large metallic surfaces of the arm and its location between the rotating disks provide for efficient cooling of the laser and the voice coils. The cross-wound voice coil is of simple manufacture, mechanically stable (it is a self-supporting structure), has optimum heat dissipation (the current flows through both coils), and can be flexibly adapted to design needs by varying the coil angle with respect to the magnetic field.

The proposed arm design allows to exploit the high storage density of optical storage media in a system with high total storage capacity, fast access and fail-safe operation. Similar arm constructions may also find use in other fields of applications, where fast and precise access means are required, e.g. in robotic devices. The optical access means described in the above embodiments can then be replaced by mechanical, electric, magnetic, etc. devices.

While the invention has been particularly shown and described with reference to preferred embodiments thereof, it will be understood by those skilled in the art that various changes in form and details may be made therein without departing from the spirit and scope of the invention:

What is claimed is:

1. Rotary arm for randomly accessing positions within a range of angles, comprising:

an elongated, lightweight arm structure (7) which is mounted at its one end to pivot about a rotation axis (10);

access means (5) positioned near the distal end of the arm structure;

two actuator coils (6a,b) mounted at the distal end of the arm structure within a magnetic field (H) and connected to actuation means (23a,b) for providing a magnetic force parallel to the plane of rotation of the arm structure when the first coil is activated and a force perpendicular to the plane of rotation when the second coil is activated.

2. The arm of claim 1, wherein the magnetic field extends radially in the plane of rotation of the axis and wherein the first and the second coils have their wire turns inclined by equal or different angles with respect to the direction vertical to that plane.

3. The arm of claim 1 or 2, wherein the magnetic field is generated by a permanent magnet cooperating with a yoke of soft magnetic material in the form of a circle section.

4. The arm of claim 3, wherein the coils are surrounded by a magnetic shielding (13).

5. The arm of claim 4, wherein the arm structure consists of folded sheet metal selected from the group of titanium or copper-beryllium.

6. The arm of claim 5, wherein the access means comprise an optical system (5a,b) to focus a laser beam on the surface of a rotating optical disk.

7. The arm of claim 6, wherein the optical system consists of a deflection prism with two conjugate plano-aspheric surfaces.

8. The arm of claim 7, used within a stack of arms on a common axis of rotation (10) in a stack of optical disks (1a,b).

9. The arm of claim 8, wherein two optical systems (5a,5b) are provided at the distal end of each arm to selectively access one of the two adjacent optical disks (1a,1b).

10. The arm of claim 9, comprising a bistable optical switch (12) in the light path of the laser beam, the switch including a mirror (40) fixed to a ferromagnetic bar (41) that can be toggled to any pole of a controllable electromagnet magnet (43,44).

11. The arm of claim 10, wherein the optical systems (8,11) for generating the laser beam and for evaluating the beam reflected from the optical disk are mounted on the arm structure in the vicinity of the rotation axis (10).

* * * * *